INVENTOR
Gerhard Dirks
BY Michael S. Striker
ATTORNEY

INVENTOR
Gerhard Dirks
BY Michael S. Striker
ATTORNEY

Sept. 22, 1970 G. DIRKS 3,530,285

ARRANGEMENT FOR PERFORMING ARITHMETIC OPERATIONS USING AN INTERMEDIATE STORAGE

Original Filed April 16, 1958 11 Sheets-Sheet 3

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

Sept. 22, 1970 G. DIRKS 3,530,285

ARRANGEMENT FOR PERFORMING ARITHMETIC OPERATIONS USING AN INTERMEDIATE STORAGE

Original Filed April 16, 1958 11 Sheets-Sheet 6

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

United States Patent Office 3,530,285

Patented Sept. 22, 1970

3,530,285

ARRANGEMENT FOR PERFORMING ARITHMETIC OPERATIONS USING AN INTERMEDIATE STORAGE

Gerhard Dirks, Los Altos Hills, Calif., assignor to Dirks Electronics Corporation, Los Altos Hills, Calif., a corporation of Delaware Continuation of abandoned application Ser. No. 421,140, Dec. 8, 1964, which is a continuation of application Ser. No. 728,983, Apr. 16, 1958. This application Oct. 23, 1965, Ser. No. 518,506

Claims priority, application Germany, Oct. 1, 1948, P 11,464

Int. Cl. G06f 7/50

U.S. Cl. 235—176 10 Claims

ABSTRACT OF THE DISCLOSURE

A number, having a plurality of decimal digits, each digit corresponding to a determined denominational order is stored on a disc, wherein each of said decimal digits is represented by at least one corresponding data bit within storage positions assigned to said denominational order. A second number may be entered on a keyboard, the keyboard also having ten storage positions assigned to each denominational order. First digit signals corresponding to the value of a digit of a given denomination in the first number are furnished simultaneously with second digit signals corresponding to the value of the corresponding digit in the second number. The sum signal representing the sum of the two digits is recorded on one track of the disc if the sum is less than ten and on another track if the sum is greater than nine. A signal sensed from the first track is then recorded directly on the output track, while a signal sensed from the other track is recorded on the output track diminished by ten while a carry signal is generated causing the first sum signal formed from digits of the next higher denominational order to be increased by one prior to recording.

This application is a continuation of my U.S. patent application Ser. No. 421,140, filed Dec. 8, 1964, now abandoned, which application Ser. No. 421,140, in turn, is a continuation of my U.S. patent application, Ser. No. 728,983, filed on Apr. 16, 1958, now abandoned, which application, Ser. No. 728,983, in turn, is a continuation-in-part of my U.S. patent application, Ser. No. 432,093, filed May 25, 1954, now abandoned, which application, Ser. No. 432,093 is, in turn, a continuation-in-part application of my U.S. patent application, Ser. No. 101,032, filed June 24, 1949, now abandoned.

This invention relates to electrically operated calculating apparatus, and more particularly to such apparatus employing a rotatable magnetic signal storage member.

It is an object of the invention to provide a rotatable magnetic signal storage member with a plurality of signal transducing heads, each of which is individually selectable.

It is another object of the invention to control selection of the signal heads by operation of the keys of a keyboard.

It is a further object of the invention to effect column shifting of digital values by the selection of the signal heads.

The invention will now be described, by way of example, with reference to the accompanying drawings, in which.

Figure 9:
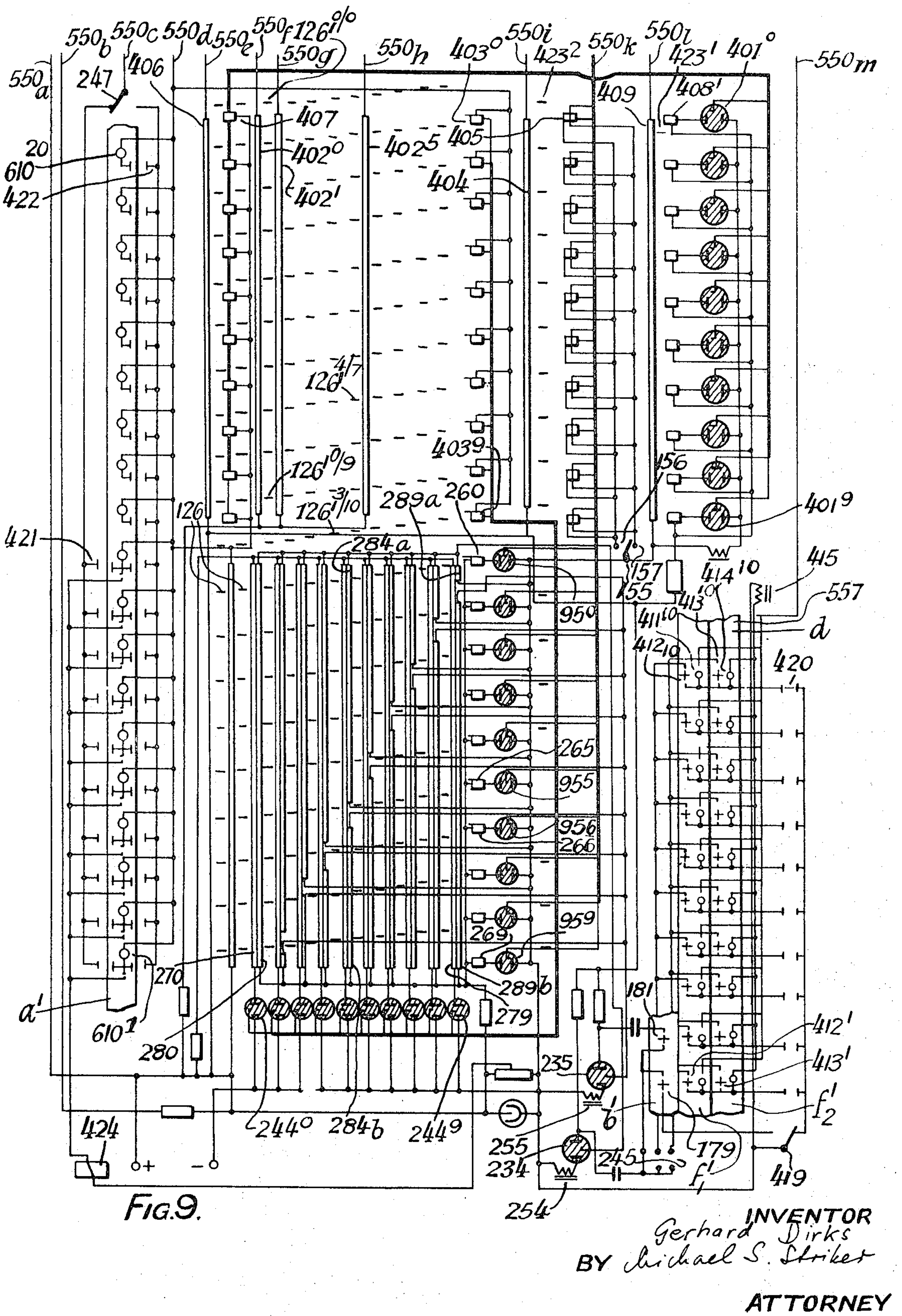
Figure 10:
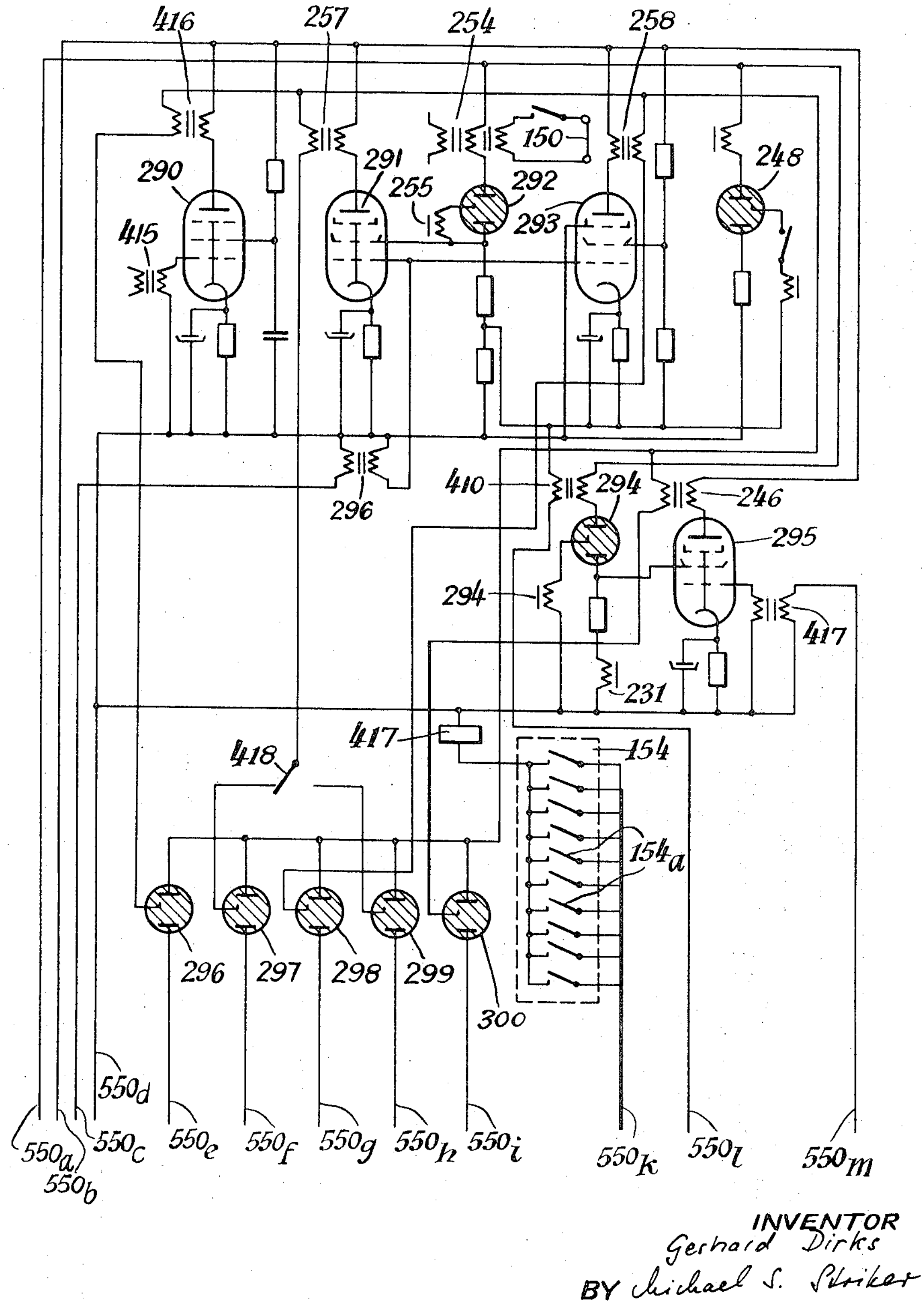
Figure 11:
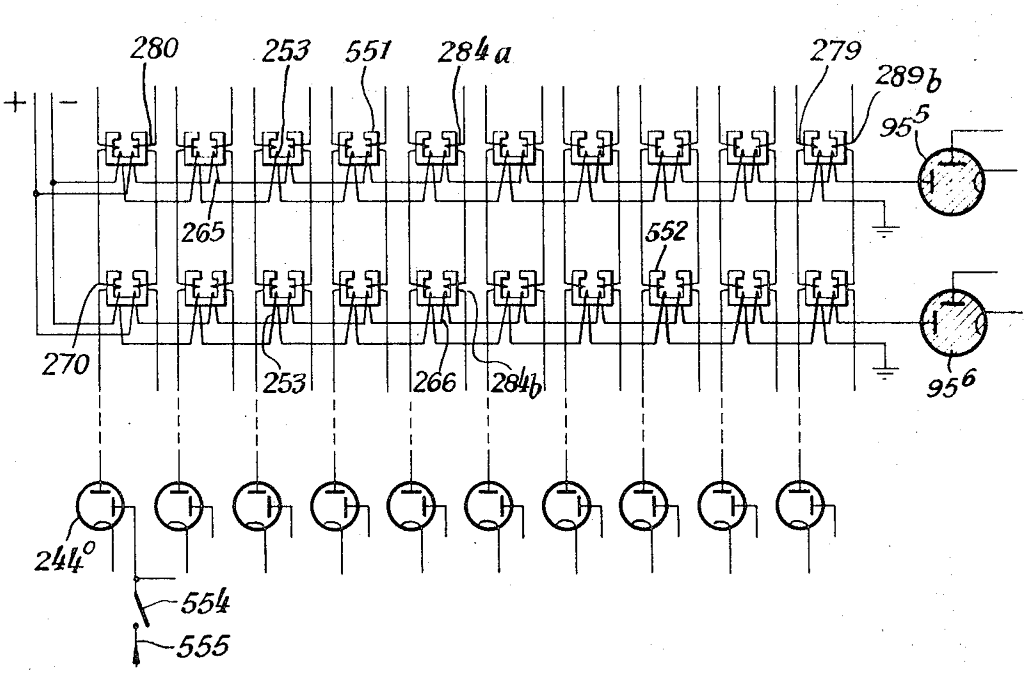
Figure 12:
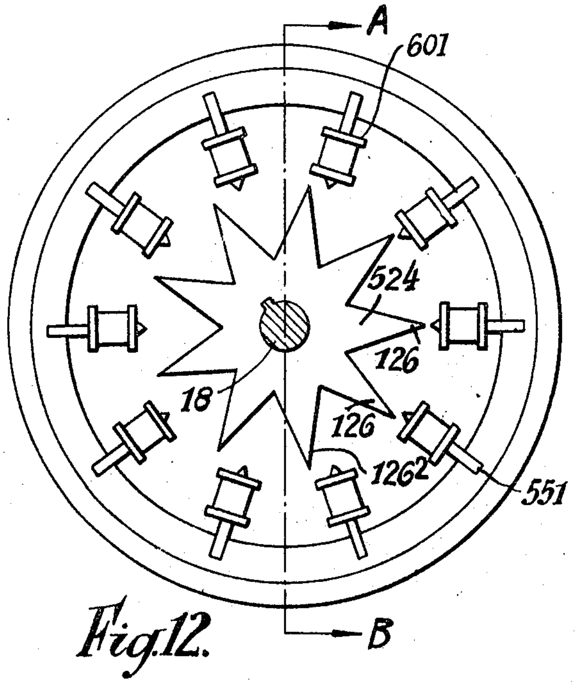
Figure 13:
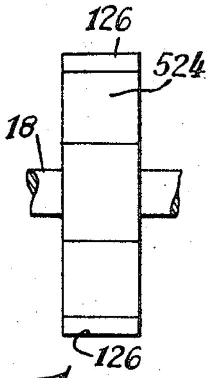
Figure 14:
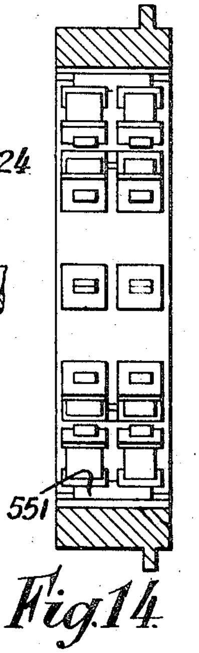

FIGS. 9 and 10 taken together form a schematic circuit diagram of an arrangement for performing multiplication and division using a matrix of magnetic core elements;

FIG. 11 is a more detailed diagram of two rows of core elements of the matrix of FIG. 9;

FIG. 12 is an elevation view of one row of core elements arranged around a motor;

FIG. 13 is a view of the motor of FIG. 12;

FIG. 14 is a sectional view on line A–B of FIG. 12 with the motor removed; and

Figure 15:
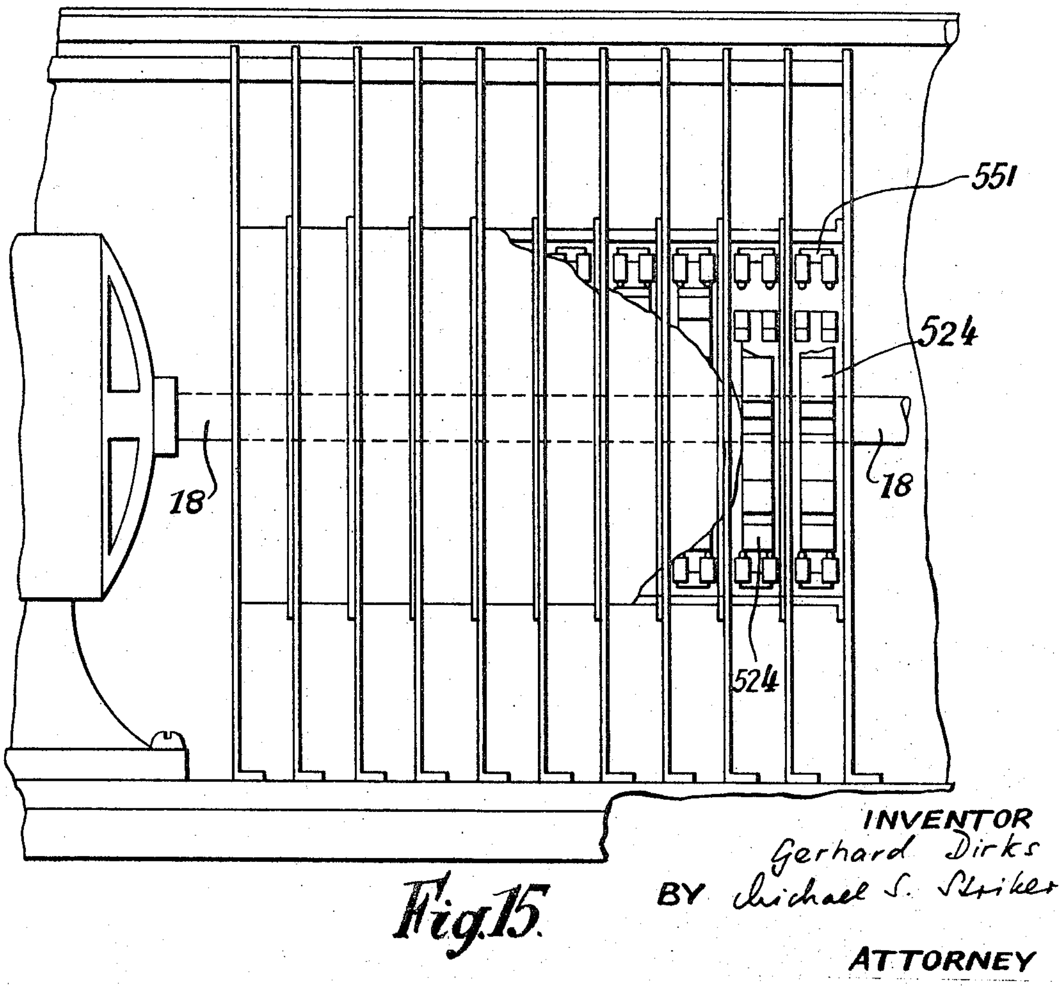

FIG. 15 shows the mounting of a plurality of core elements and the associated motors as shown in FIG. 12.

The embodiment of the invention to be described employs a multi-denomination keyboard for entry of numbers and a step by step printing mechanism for the recording of visually readable results of calculations. The printing mechanism may consist of individual character bars similar to a conventional typewriter, a single print bar carrying all the numerical characters or a printing device, such as that described in detail in my copending patent application Ser. No. 432,297 of Mar. 30, 1955, now abandoned, a continuation, Ser. No. 814,814, matured into U.S. Pat. 2,976,801 in which the outline of each printed character is built up by a number of impressions.

Storage for numerical values is provided by a magnetic storage disc, the values being represented by signals magnetically recorded on the surface of the disc. The storage device is used in conjunction with an arithmetic unit for the arithmetic processing of values. A value is read denomination by denomination from the storage disc by an associated magnetic transducing head and the value representing signals are applied to the arithmetic unit. The arithmetic unit generates result value signals which are applied to a further magnetic transducing head to effect recording of result value signals, denomination by denomination, on the surface of the storage disc.

The storage disc is provided with a plurality of storage tracks, each of which is used for the storage of one numerical value. Each track is divided into sectors, each of which is used for the recording of signals representing one digit of a numerical value. One or more magnetic transducing heads are associated with each storage. The disc rotates continuously so that the sectors of a track pass a particular associated transducing head in succession. Thus the head may be used for reading or recording signals representing a value in a digit by digit fashion.

Signals sensed from the storage disc may be fed to an electronic arithmetic unit which may perform addition, subtractions, etc., also in a digit by digit fashion. The output signals from the arithmetic unit, representing the sum, etc., may be recorded digit by digit in one of the storage tracks of the disc. Means are provided for scanning, in synchronism with the rotation of the disc, the value set up on a keyboard, so that the value may be recorded digit by digit in a storage track, or may be added to a second value read from a storage track and the sum of the two values recorded in a storage track.

Each sector of a track has a particular denominational significance. As the sectors are read in succession, the denominational significance of signals is related to their time of occurrence in the cycle of revolution of the storage disc. Some tracks may be provided with several heads spaced apart by a distance equal to a sector. If one of such a group of heads is regarded as providing a standard time in the cycle for reading out a sginal which is recorded in the track, then the selection of another head will advance or retard the timing of the reading out relative to the standard by a time equivalent to a whole number of secors. Thus the denominational significance of the signals may be changed, that is, the value may be effetcively column shifted. This facility is of use in relation to performing multiplication and division of decimal numbers.

Each sector is divided into storage areas representing different digit values within a denomination. These areas are also sensed successively. Hence the use of heads spaced apart by distances corresponding to one storage area enable a change to be made in the digital value of a signal. For example, if a signal recorded in the storage area of a track representing the digit 2 is sensed by a head able to record on another track and the heads are so positioned that the recording head is over a storage area representing the digit 8 at this time, then the sensing of signal in the other track. Thus this combination of heads has the effect of adding 6 to the sensed digit and recording the sum. A group of ten heads suitably spaced apart along one track and which may be selectively coupled to one head on the other track enable any digit from 0–9 to be added to the sensed digit. In this way the sum of two digits may be formed and recorded in the track. Subtraction is performed by selecting the heads for coupling in such a manner that the addition is performed with one of the two digits expressed in complemental form.

Figure 1:
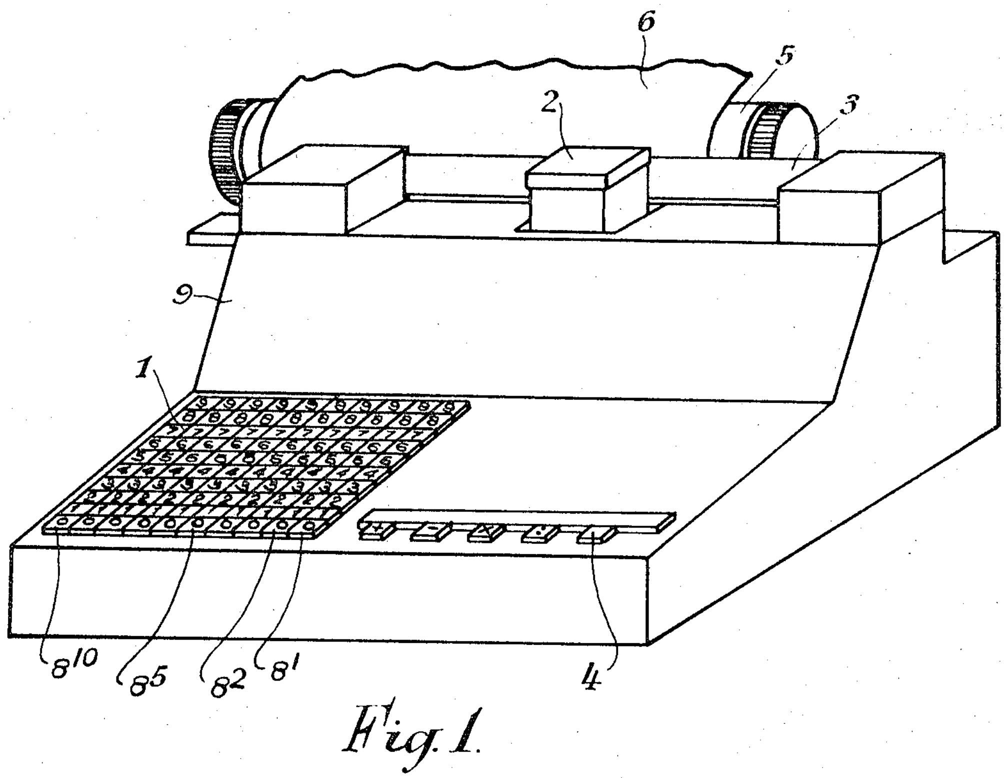
FIG. 1 is a schematic illustration of an electric calculator showing the keyboards and printing mechanism.

FIG. 1 is a schematic illustration of an electric calculator. A platen 5 is mounted in the usual form of typewriter carriage which is supported by the main body 9. A printing mechanism 2 is also mounted on the main body of the machine, and by means of an inked ribbon 3 may be used to print characters on a sheet of paper 6 which passes around the platen 5.

The machine is provided with two sets of keys 4 and 8. The keys 4 are used for controlling the function of the machine such as addition, subtraction and printing. The keys 8 provide a full keyboard for the entry of numerical values. These keys are arranged in ten columns 8–1 to 8–10, each column containing ten keys which correspond to the digits 0–9. Thus to enter the value twenty-four, for example, the 4 value key is depressed in the column $8^1$, the 2 value key is depressed in the column $8^2$ and the 0 value key is depressed in each of the remaining columns.

Figure 2:
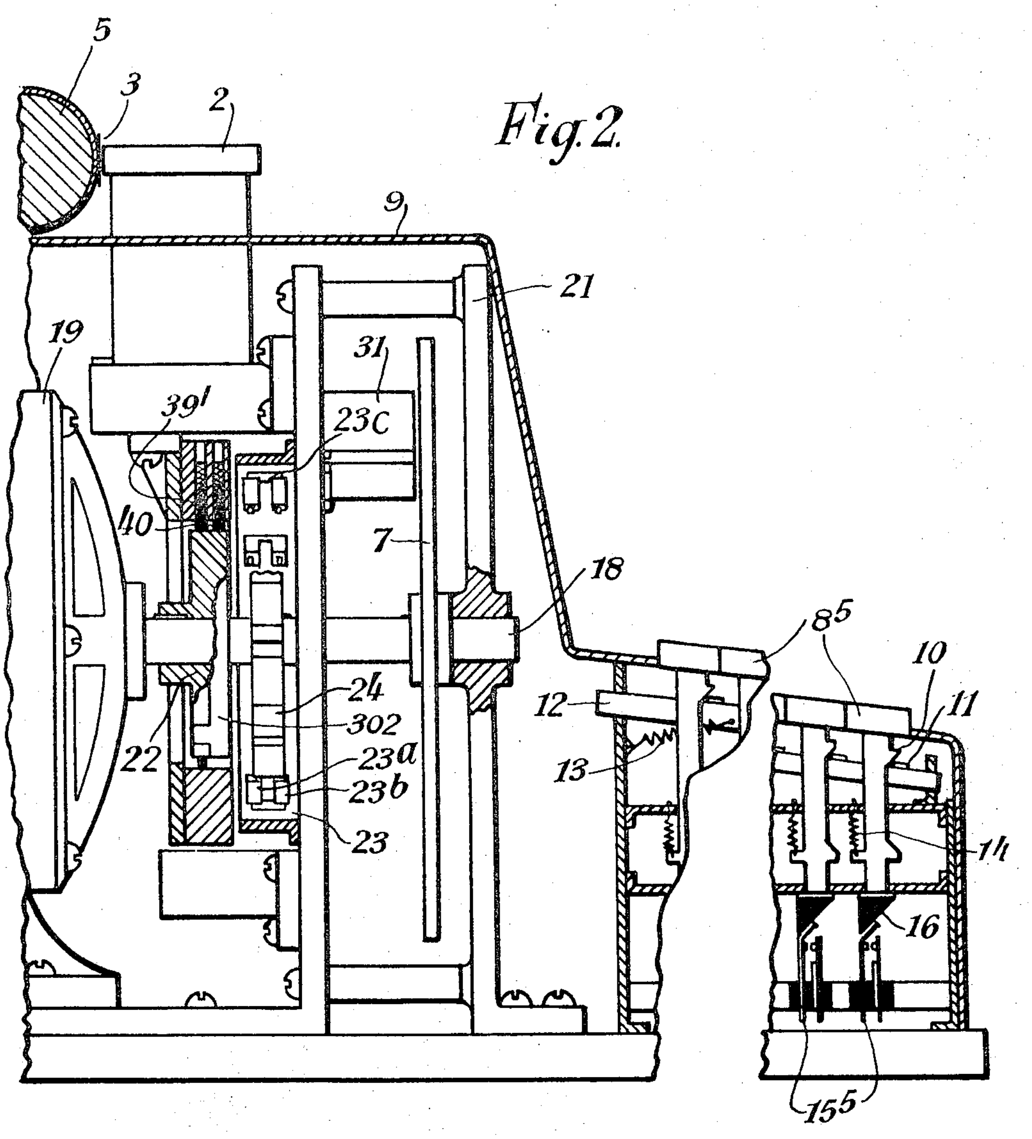
FIG. 2 is a partial sectional view of the calculator of FIG. 1, showing the magnetic disc storage device.

Each key 8 is normally urged upwards by a spring 14 (FIG. 2) which is attached to a projection on the stem of the key. In this position, a further projection 10 lies above a latch 11. All the latches 11 for a column of keys are mounted on a single slide 12 which is urged to the left as seen in FIG. 2 by the spring 13. When one of the keys 8 is fully depressed the projection 10 lies below the related latch 11 so that the key is held in the downward position. During the depression of the key the engagement of the projection 10 with the latch 11 causes the slide 12 to move to the right. If another key in the same column is already in the downward position, the movement of the slide withdraws the latch from the projection 10 of this key which returns to the upper position under the action of the associated spring 14.

The lower end of each key stem carries an insulating member 16 which is positioned above one of a pair of contact members 15. When a key is latched in the downward position, the member 16 engages one of the contact members 15 and forces it into engagement with the other contact member of the pair.

Numerical values are stored in the form of selectively magnetized area on the magnetizable surface of a disc 7, which is mounted within the body of the machine. The disc 7 is secured to a shaft 18 which is supported in frame members 21. The shaft 18 may be rotated by means of an electric motor 19. A plurality of magnetic head assemblies are secured to one of the frame members 21 in such positions that they cooperate with the magnetizable surface of the disc 7. One such assembly is referenced 31 in FIG. 2 and each assembly may consist of one or more magnetic heads for reading, recording or erasing magnetic signals on the surface of the disc 7.

A rotor 24 is also secured to the shaft 18. The rotor 24 forms part of an inductively operating signal distributor in association with a number of U-shaped magnetic yokes 23*c*, each of which carries a primary coil 23*a* and a secondary coil 23*b*. The yokes 23*c* are attached to a circular frame 23 which is in turn attached to one of the frame members 21.

The shaft 18 carries a second rotor 22 which has a number of conducting segments which cooperate with contact brushes such as $\mathbf{39^1}$ and 40.

Figure 3:
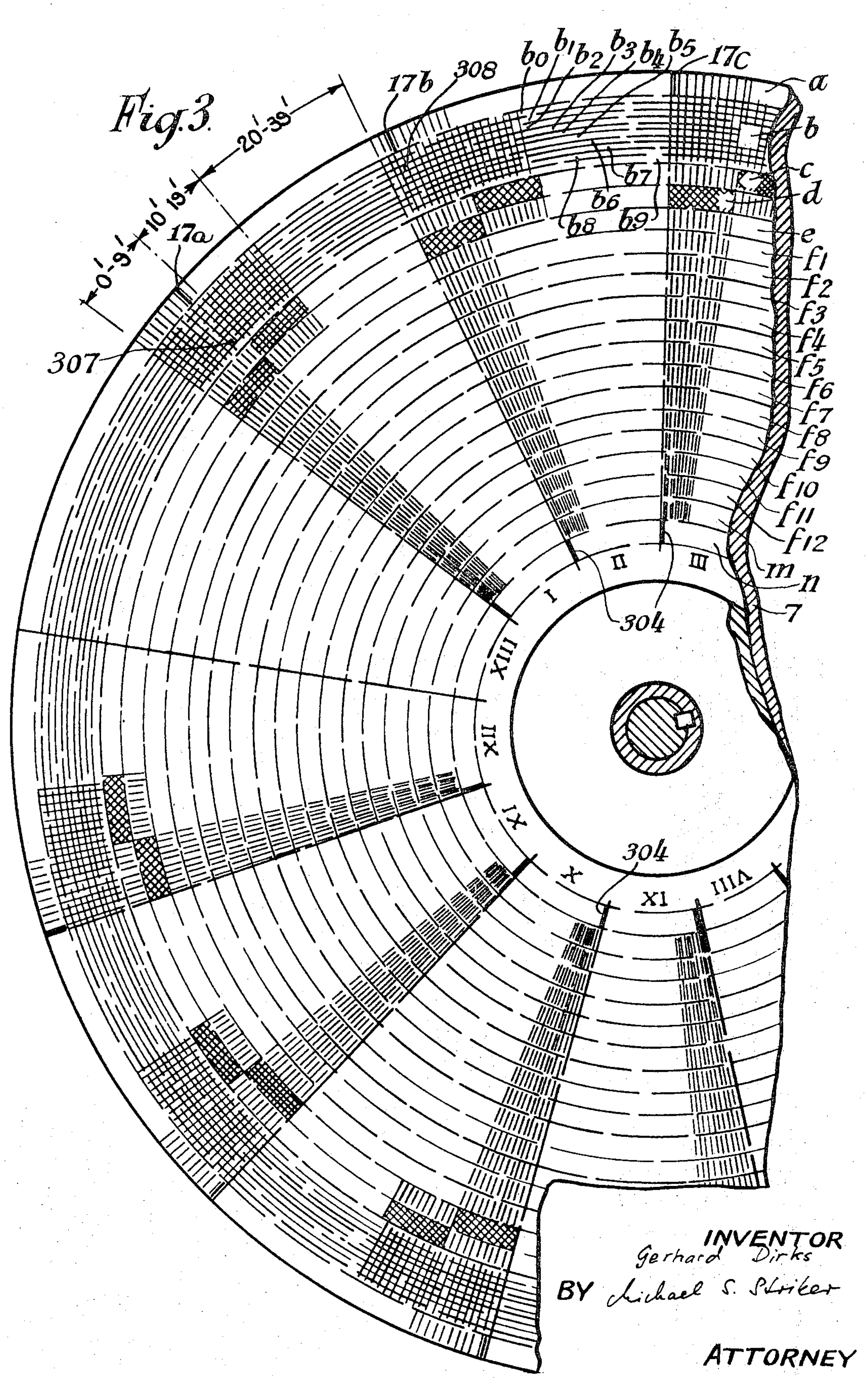
FIG. 3 is a schematic illustration of part of the magnetic storage disc to show the division of the disc into different storage areas.

The magnetizable surface of the disc 7 is to be regarded as being divided into a large number of individual signal storage areas. The surface of the disc provides a number of circular storage tracks *a*, *b*, *c*, *d*, *e*, *f*1 to *f*12, *m* and *n* (FIG. 3). Each track comprises a plurality of storage areas and is used for the recording of signals representing the digits of one numerical value. The surface of the disc is divided radially into thirteen sectors I to XIII. Each of the sectors I to XII is associated with one denomination of a recorded numerical value. Thus, the least significant digit of a numerical value is always recorded within the confines of sector I irrespective of the storage track in which it may be recorded. Similarly, the next most significant digit of a value recorded in track *a* is recorded within the sector II section of that track, and the digit of the same significance of a number recorded in track *f6*, for example, is recorded within the sector II section of track *f6*. Sector XIII is not used for storing numerical values and provides a blank time in each revolution of the disc 7 during which switching operations may be performed.

Signals may be magnetically recorded on any part of surface of the disc 7 lying within the boundaries of the tracks *a* to *n*, except for certain areas of the track *c* and *d*, which areas are indicated by cross hatching in FIG. 3. The purpose of these blank areas will become apparent when the arithmetic operations of the calculator are considered in more detail hereinafter. The magnetic surface of the disc may consist of a plating or coating of suitable magnetic material the disc itself being of non-magnetic material. Suitable magnetic materials are well known in the field of magnetic sound recording. The magnetic material is not applied to the surface of the disc in the areas indicated by cross hatching. Alternatively the disc may itself consist of a suitable magnetic material and the cross hatched areas are then recessed sufficiently far below the general level of the surface of the disc to prevent effective recording taking place in such areas.

Each sector of each track is divided into forty signal storage areas $0^1$ to $39^1$, as is shown for sector I in FIG. 3. In general, the storage areas $\mathbf{0^1}$ to $\mathbf{9^1}$ of each sector are used for the storage of digital values, and the areas $\mathbf{10^1}$ to $\mathbf{39^1}$ are used in the arithmetic processing and transfer of values from one track to another. A particular digit value is represented by recording a signal which has an abrupt change within the storage area corresponding to the value of the digit. For example, in track *a* such a change occurs in the storage area $\mathbf{8^1}$ as indicated by the mark 17*a*, so that the recording in sector I of track *a* represents the digit value 8. In a similar way, the marks 17*b* and 17*c* indicate that the digit values 2 and 0 are recorded in sectors II and III of track *a* respectively. Thus, assuming that signals representing zero are recorded in the remaining sectors of track $a$ the numerical value recorded in the track is 000 000 000 028.

The desired digit representing change may be obtained in any one of the several ways. The surface of the disc may normally be magnetically neutral, and the signals such as 17$a$ are represented by strongly magnetized areas. Such a signal is produced by applying a current pulse to a recording head at a time when the particular storage area is passing beneath the gap of the head. Alternatively, the surface may normally be strongly magnetized in one direction and the current pulse made of sufficient amplitude to reverse the direction of magnetization in the required storage area.

As shown, in FIG. 3, the track $b$ of the disc is divided into ten-subtracks $b_0$ to $b_9$. Two separate head assemblies $32^0$ to $32^9$ and $33^0$ to $33^9$ (FIG. 4) are associated with the ten subtracks of the track $b$. The suffix number of each head indicates the number of the subtrack with which it is associated. The gaps of the heads 32 are staggered circumferentially as well as radially, the circumferential spacing between the gaps of adjacent heads being equal to the spacing between adjacent storage areas in each track. Thus, when the gap of the head $32^0$ is opposite the storage area $0^1$ of a sector in the track $b_0$, then the gap of the head $32^9$ is opposite the storage area $9^1$ of the track $b_9$, and similarly for the intermediate heads. On the other hand the heads 33 are staggered in a radial direction only, so that when the gap in the head 33° is opposite the storage area $0^2$ of the track $b_0$, the gap of the head $33^9$ is opposite the storage area $0^1$ of the track $b_9$.

A pair of heads $34^1$ and $35^1$ is associated with the track $c$. The gap in the head $34^1$ is spaced in a circumferential direction from the gap in the head $35^1$ by a distance equal to the separation between adjacent storage areas. A similar pair of heads $34^2$ and $35^2$ is associated with the track $d$. The heads $33^0$ to $33^9$, $34^1$ and $34^2$ lie on the same radial line. A head 31 cooperates with the track $a$ and lies on the same radial line as the head $32^0$.

The construction of the head 31 is similar to that of magnetic heads used for sound recording on magnetic tape, and it consists of a substantially rectangular lamination of magnetic material with a gap in one side. A coil is wound on the opposite side of the lamination and acts as an energizing coil when the head is used for recording and as a pick-up coil when the head is used for reading. Preferably the head is mounted so that the gap is in close proximity to the magnetic surface of the disc 7 but the head is not in actual contact with the disc. This allows effective reading and recording while preventing wear of the disc or the head.

The individual heads 32, 33, etc., may be similar in construction to the head 31. However, where a number of heads are used in close proximity the spacing of the storage areas and tracks may be limited by the physical size of the individual heads. In such cases it may be more convenient to use an arrangement in which a number of heads are mounted as a unitary assembly.

Figure 4:
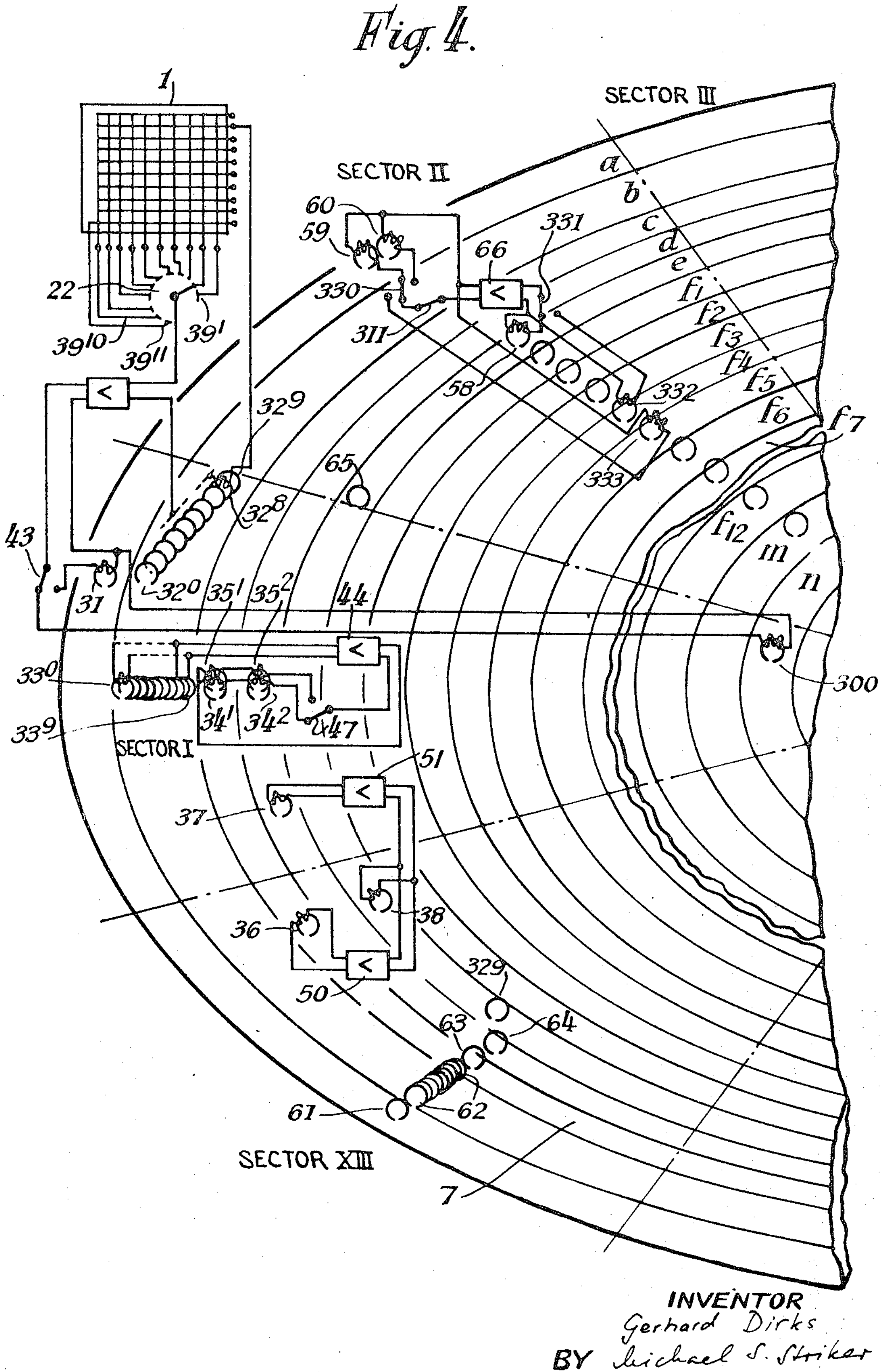
FIG. 4 is a schematic illustration of part of the magnetic storage disc, the associated magnetic transducing heads and amplifying and control circuits.
Figure 5:
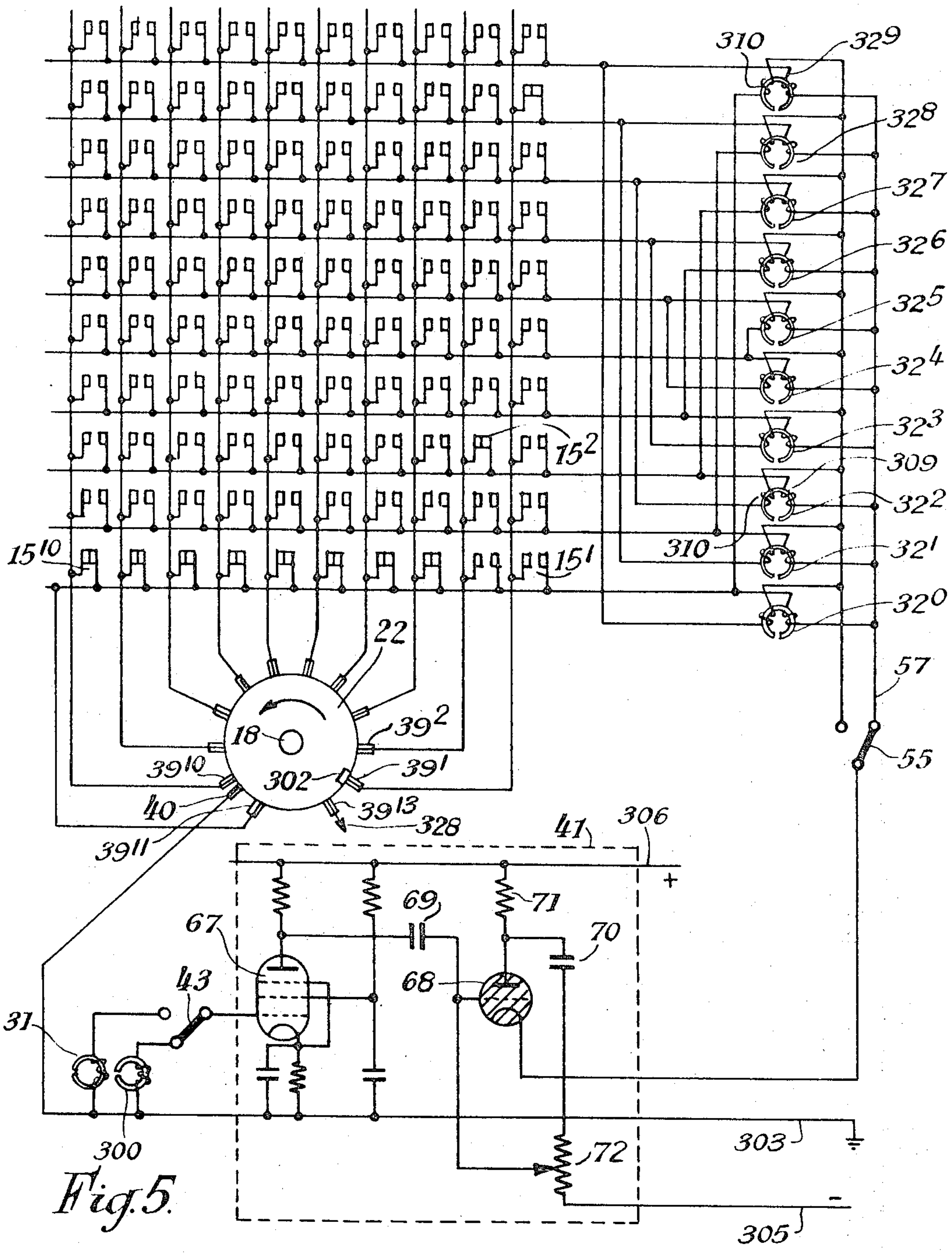
FIG. 5 is a circuit diagram showing keyboard controlled contacts for data entry and the associated signal recording circuit.

A value set up on the keyboard 1 by a depression of the appropriate keys 8 is recorded in the tarck $b$ of the disc 7 by the heads 32. The different denominational values represented by the different columns of keys must be recorded in the corresponding sectors of the disc 7 and this function is performed by the distributing commutator or switch formed by the rotor 22 and the brushes 39 and 40. The brush $39^1$ (FIGS. 2, 4 and 5) is connected to one contact of each of the pairs of contacts $15^1$ which are operated by the keys 8 in the first column of the keyboard. Similarly, the brush $39^2$ is connected to one contact of the pairs of contacts $15^2$ and so on for the other brushes 39. The other contact of each pair is connected to a winding 309 on that one of the heads 32 which corresponds to the digital value represented by the contact and also to a winding 310 on that head which corresponds to the complement of the value. As will be explained, with a switch 55 in the position shown, the windings 309 are effective. Thus the row of contacts $15^1$ to $15^{10}$ which are opearted by the 0 value keys are connected to the winding 309 on the head $32^0$, the contacts associated with the 1 value keys are connected to the winding 309 on the head $32^1$ and so on. The common brush 40 of the commutator is connected to a ground line 303 (FIG. 5). With the rotor 22 in the position shown in FIG. 5, there is then a circuit from the ground line 303, the common brush 40, the metallic segment 302, the brush $39^1$ and the 8 value contact $15^1$ to the head $32^8$, it being assumed that the 8 value key 8 is depressed in the lowest denomination of the keyboard. The relative positions of the rotor 22 and the disc 7 on the shaft 18 are such that the sector I part of the track $b$ is passing the recording heads 32 during the time that the circuit is completed through the brush $39^1$. As the rotor 22 moves counterclockwise, the segment 302 will break contact with the brush $39^1$, so that a circuit is completed to the head $32^2$ as determined by the closed state of the 2 value contacts $15^2$. Thus the heads 32 are placed under control of the different columns of keys in turn, as the corresponding sectors of the disc 7 pass beneath the heads 32.

The exact time at which signals are recorded in the track $b$ is determined by signals sensed from the tracks $a$ or $n$ of the disc 7. It will be seen from FIG. 3 that signals 304 are recorded in the storage position $0^1$ of each of the sectors I to XII of the track $n$. These signals are sensed by a magnetic head 300 (FIGS. 4 and 5) which may be connected to the input of an amplifier 41 by setting a switch 43. The head 300 lies on the same radial line as the heads 31 and $32^0$.

The amplifier 41 comprises a pentode 67 and a gas triode 68 (FIG. 5). Signals induced in the winding on the head 300 by the passage of recorded singals 304 past the head gap are fed to the control grid of the pentode 67 via the switch 43 (in the position shown). The pentode 67 is connected as a conventional resistance-capacity coupled amplifier. The winding of the head 300 is so connected that the passage of a signal 304 past the gap of the head causes a negative voltage impulse to be applied to the control grid of the pentode 67. The resulting amplified positive pulse which appears at the anode of the pentode is fed to the grid of the gas triode 68 via a capacitor 69. The grid of the triode 68 receives a negative bias from a potentiometer 72 which is connected between the ground line 303 and a negative supply line 305. This bias normally holds the triode in a non-conducting condition. The anode of the triode is connected through a resistor 71 to a positive supply line 306 and a capacitor 70 is connected between the anode and the ground line 303. The amplitude of the positive pulse fed to the grid of the triode 68 when the head 300 senses one of the signals 304 is sufficient to overcome the bias and ionize the triode.

The cathode of the triode 68 is connected in common, via the switch 55 in the position shown, to one side of the windings 309 of all the heads $32^0$ to $32^9$. Thus, when the triode 68 is ionized, or in its conductive condition, cathode current flows through one of the heads 32, selected by a closed contact of the keyboard and the commutator to the ground line 303. The values of the resistor 71 and the capacitor 70 are such that the conduction current of the triode rapidly reduces the anode voltage to a value which is insufficient to maintain ionization or conduction, so that the triode deionizes or becomes nonconductive and a relatively short pulse of current flows in the cathode circuit. The capacitor 70 then recharges to the full supply voltage through the resistor 71 before the time at which the next signal 304 is sensed by the head 300.

The signal 304 in sector I of the track $n$ will be sensed while the commutator rotor 22 is in the position shown in FIG. 5.

Hence the cathode current of the triode 68 flows thorugh the winding 309 of the head $32^8$, the 8 value contact $15^1$ which is closed, the brush $39^1$, the segment 302 and the common brush 40 to the ground line 303. The pulse of cathode current in the winding 309 of the head $32^8$ energizes the head to produce a discrete area of magnetization on the surface of the disc 7 in track *b*. Since the heads 300 and $32^0$ lie on the same radial line, the signal 304 which is in the storage position 01 will be sensed at the same time as the gap in the head $32^0$ is positioned over the storage area 01 in the sub-track $b_0$. It has already been explained that the heads 32 are staggered circumferentially from each other by a distance equal to one storage area, so that it will be apparent that the head $32^8$ is positioned at this time over the storage $8^1$ in the sub-track $b_8$. Consequently, the pulse of cathode current flowing thorugh this head will record a signal in the storage position $8^1$ of the sub-track $b_8$. Thus the signal 307 is recorded to represent the digit value 8 in accordance with the keyboard setting in the lowest denomination.

As the disc 7 continues to rotate the signal 304 in sector II will pass beneath the head 300, so that the gas triode 68 will receive another impulse on its control grid. The commutator rotor 22 will have moved a corresponding distance and the cathode circuit of the triode 68 will be completed through the winding 309 of the head $32^2$, the 2 value contact $15^2$, the brush $39^2$, segment 302 and the common brush 40 to the ground line 303. The pulse of cathode current will cause the head $32^2$ to reocrd a singal 308 in the storage position $2^1$ of the sub-track 32 to represent the digital value 2 set up in the second column of the keyboard. As the disc 7 continues to rotate, signals will be recorded in the storage position $0^1$ of the sub-track $b_0$ in the sectors III to X in a similar way. Thus the value set up on the keyboard is recorded in the form of signals in the track *b*, one digit value being recorded in each sector.

The keyboard 1 has ten denominational columns of keys 8, whereas the disc 7 has twelve sectors in which numerical values may be recorded. Sector XII is used for recording the carry which may occur during subtraction. Zero or the complement thereof is entered in sector XI from the keyboard by the direct connection of the commutator brush $39^{11}$ to one end of the winding 309 on the head $32^0$ and to one end of the winding 310 on the head $32^9$.

By setting the switch 43 to the other position, the sum of the value set up on the keyboard and the value recorded in the track *a* may be recorded in track *b*. The switch 43 may be set to one or other position under the control of one of the function keys 4 of the keyboard 1. It will be assumed, by way of example, that the value 28 is set upon the keyboard and that the value 28 is also recorded in track *a*. The recording takes place in track *b* in a manner similar to that described above, except that the time at which the triode 68 is ionized is now determined, not by the signals 304, but by the signals 17*a*, 17*b*, etc., since the control grid of the pentode 67 is now connected to the head 31 via the switch 43. Starting with sector I passing the heads 31 and 32, there is no signal recorded in the $0^1$ storage position of track *a*, corresponding to the signal 304 in track *n,* so that the head $32^8$ is not energized at this time. No recording takes place until the disc has moved to bring the signal 17*a* in track *a* past the gap in the head 31. The head 31 then applies a pulse to the pentode 67, which in turn applies a pulse to the control grid of the triode 68 to ionize it. Since the heads 31 and $32^0$ lie on the same radial line, the head $32^0$ is over the storage position $8^1$ of the sub-track *b*0 at this time and the head $32^8$ is over the storage position $16^1$ of the sub-track $b_8$. Accordingly, the head $32^8$ will record a signal in the storage position $16^1$ of the sub-track *b*8 to represent the value 16, which is the sum of the 8 recorded in the first sector of track *a* and the 8 set up on the first column of the keyboard, without subtraction of the decimal carry.

In a similar manner, the signal 17*b* in track *a* will be sensed by the head 31 when the head $32^0$ is opposite storage position $2^1$ in sector II of sub-track *b*0. Since sector II is being recorded in, the head $32^2$ is connected in the cathode circuit of the triode 68 by the keyboard and the commutator, and this head will be over the storage position $4^1$ in sector II of the sub-track *b*2. Accordingly, the sensing of the signal 17*b* by the head 31 will cause recording of a signal in the storage position $4^1$ of sector II of the sub-track $b_2$ by the head $32^2$. It will be apparent that signals will be recorded in the storage position $0^1$ of the sub-track $b_0$ in the sector III to XII.

In this way signals representing the values 16 and 4 are recorded in the sectors I and II, respectively, representing the sum of 28 and 28 without propagation of the decimal carry. The conversion of the sum recorded in track *b* to the correct decimal representation will now be described. The signals in the track *b* are sensed and recorded selectively in either the track *c* or track *d* depending upon whether the digit value is less than ten or more than ten. The recording of these signals is controlled by a carry switch 47 (FIG. 4) so that account of the appropriate carries is taken in the record. Finally the signals are sensed from the tracks *c* and *d* and are recorded in track *e* in decimal form.

The signals recorded in the sub-tracks $b_0$ to $b_9$ of track *b* are sensed by heads $33^0$ to $33^9$ (FIG. 4) which are connected in parallel to the input of an amplifier 44. The heads $33^0$ to $33^9$ lie on the same radial line and the head $33^0$ is spaced by ten storage positions from the head $32^0$. This is shown more clearly in FIG. 8 which schematically illustrates the relative positions of the various sensing, recording and erasing heads, which are shown in FIG. 4. Each sensing head is represented by a circle, each recording head is represented by a cross and each erasing head is represented by an asterisk.

Figures 6, 7:
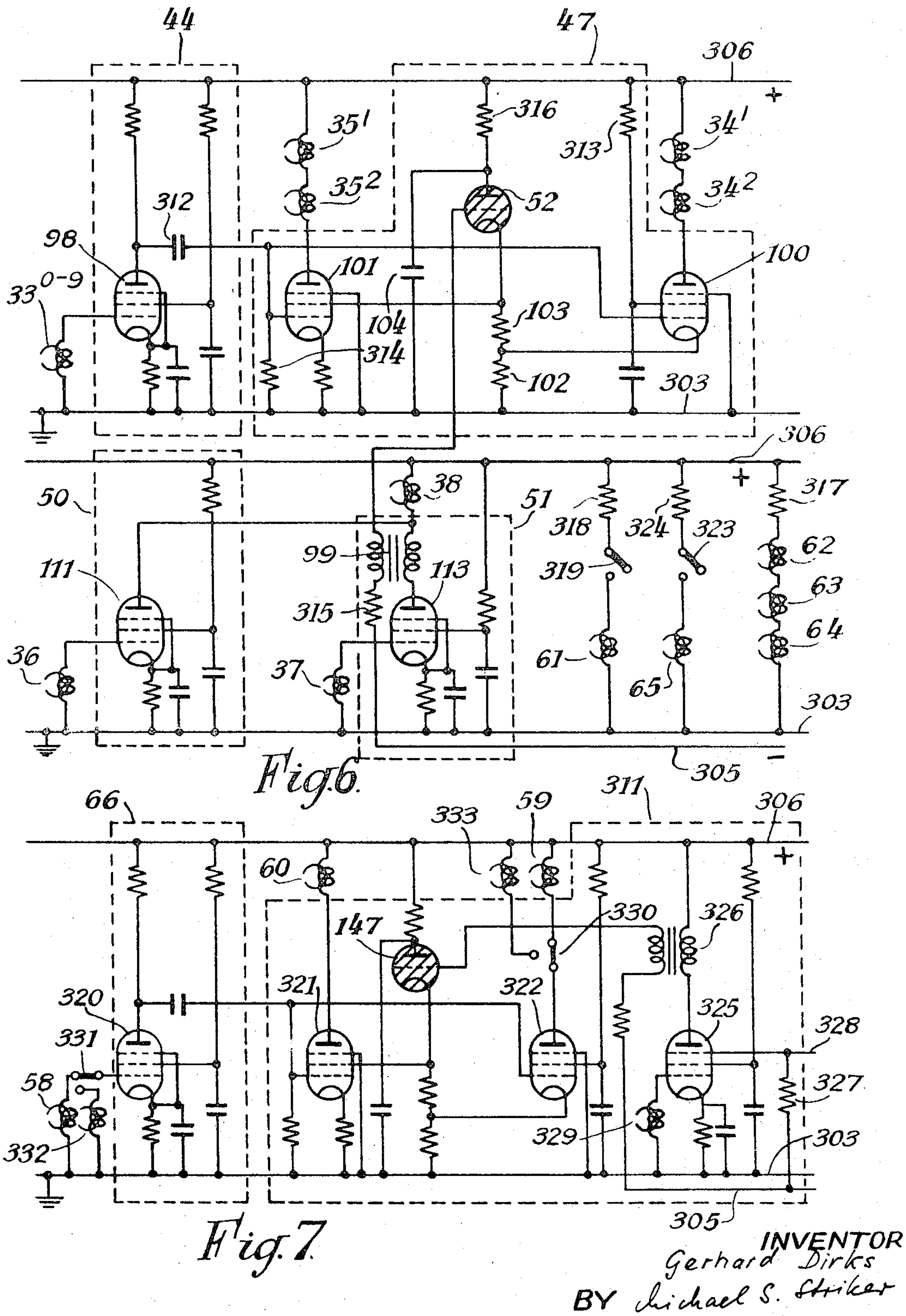
FIG. 6 is a circuit diagram of the arithmetic unit.
FIG. 7 is a circuit diagram of a signal transfer and correction circuit.

The amplifier 44 is formed by a pentode 98 (FIG. 6) which is connected as a conventional resistance-capacity coupled amplifier. The windings of the heads $33^0$ to $33^9$ are all connected in series to the control grid of the pentode 98 and the windings are so poled that each time a signal is sensed by any one of the heads 33 a positive pulse appears at the anode of the pentode 98. Such a pulse is applied via a capacitor 312 to the control grids of two pentodes 100 and 101. These two pentodes together with a gas triode 52 form the carry switch 47 (FIGS. 4 and 6). The triode 52 has two cathode load resistors 103 and 102 in series. The screen grid of the pentode 101 is connected directly to the cathode of the triode 52. The cathode of the pentode 100 is connected to the junction of the two resistors 102 and 103. Hence, when the triode 52 is non-conducting the screen of the pentode 101 is only slightly positive and no appreciable anode current flows. The screen of the pentode 100 is connected through a resistor 313 to the voltage supply line 306. The control grids of both pentodes are connected through a resistor 314 to the ground line 303, and the suppressor grids are connected directly to the line 303. The resistance value of the resistor 102 is such that the pentode 100 passes relatively little anode current. The recording heads $35^1$ and $35^2$ are connected in the anode circuit of the pentode 101 and the heads $34^1$ and $34^2$ are connected in the anode circuit of the pentode 100.

When the control grids of the pentodes 100 and 101 receive a positive pulse due to the sensing of a signal by any one of the heads $33^0$ to $33^9$, the pentode 100 is driven heavily in to conduction, so that a large anode current flows through the heads $34^1$ and $34^2$. Since the screen voltage of the pentode 101 is so low the positive pulse has substantially no effect on the anode current thereof. The anode current of the pentode 100 flowing Hence, after the signals have been recorded in the track *e* the signals in the track *b*, *c* and *d* are erased by the erasing heads.

An erasing head 61 is associated with the track *a*. The head 61 is connected in series with a switch 319 and a resistor 318 between the supply line 306 and the ground line 303. Thus if the switch 319 is closed a continuous current passes through the head 61 and the head produces a flux which erases the signals recorded in the track *a*. The switch 319 may, for example, be operated by the function keys of the keyboard.

Figure 8:
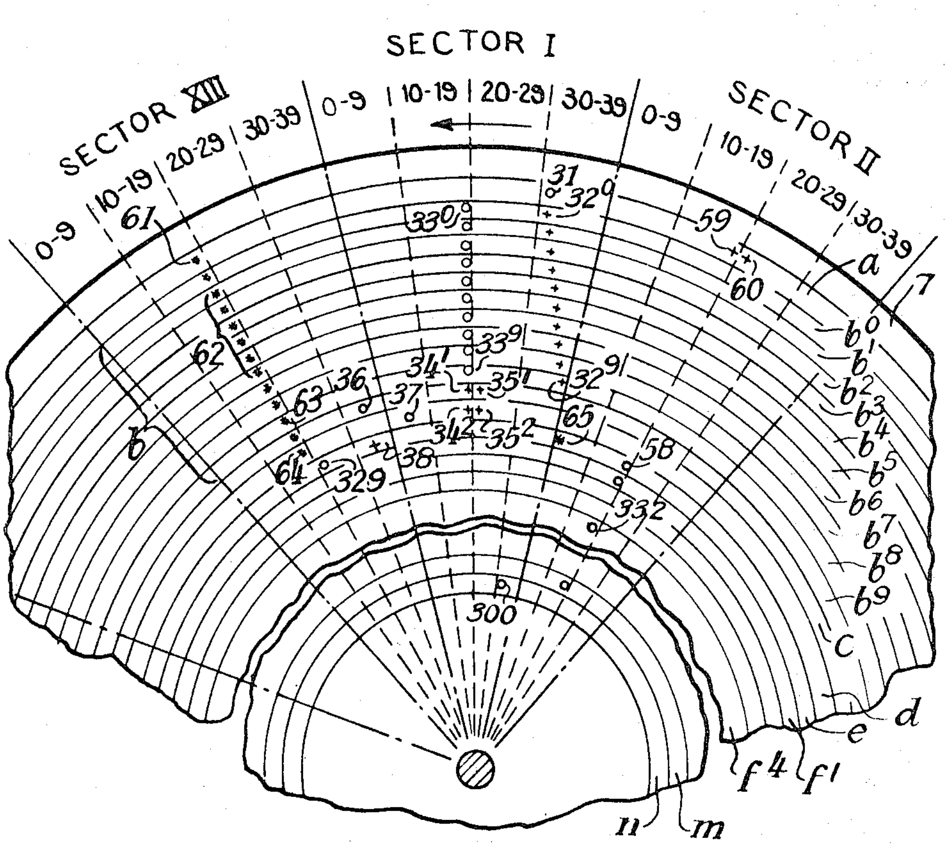
FIG. 8 is a schematic illustration of part of the magnetic storage disc to show the relative positioning of the magnetic transducing heads.

If the signals recorded in the track *a* are erased by the head 61 after they have been added to the values represented by the keyboard the sum value may be transferred from the track *e* to the track *a*. This is effected by a sensing head 58 in the track *e* and a recording head 59 associated with the track *a*. The head 58 is positioned a distance equal to twenty storage positions from the head $32^9$ (FIG. 8). Signals from the head 58 are fed to a resistance-capacity coupled amplifier 66 (FIGS. 4 and 7), which incorporates a pentode 320. The signals from the amplifier 66 are fed to the control grids of two pentodes, 321 and 322. The pentodes 321 and 322 form part of a signal gating arrangement 311 which operates in a manner generally similar to the gating arrangement formed by 47 of FIG. 6. The pentode 322 is normally allowed to respond to signals from the amplifier 66 by a gas tube 147 which prevents the pentode 321 responding to such signals. The gas tube 147 is effective to render the pentode 321 operative, and the pentode 322 inoperative, only in certain cases of subtraction, as will be explained in more detail hereinafter. Consequently, for the transfer of sum values from the track *e* to the track *a* the pentode 322 may be regarded as operating as an amplifier. Consequently, each time the head 58 senses a signal in the track *e* the head 59 will be energized by the pentode 322 to record a signal in track *a*. Since the heads 58 and 59 lie on the same radial line, the head 59 will record a signal in the storage position in track *a* which corresponds to that which contained the signal in track *e*. Hence after all the sectors have passed beneath the head 58, the value stored in track *e* will have been recorded in track *a*. An erasing head 65 is associated with the track *e* and may be made operative to erase the signals recorded in that track by closing a switch 323 (FIG. 6), which connects the head 65, in series with a resistor 324, between the supply line 306 and the ground line 303.

Subtraction is effected by complementary addition. In order to subtract a value set up on the keyboard 1 from a value recorded in the track *a* the switch 55 (FIG. 5) is set to the alternative position, so that the cathode of the tube 68 is connected to one end of all the windings 310 on the heads 32, instead of to the windings 309. The windings 310 are connected to the keyboard in a complementary fashion relative to the windings 309, so that for example the winding 310 of the head $32^0$ is connected to the 9 value keys, the winding 310 of the head $32^1$ is connected to the 8 value keys, and so on. Hence, it will be apparent, with 28 entered on the keyboard as is shown in FIG. 5, that the head $32^1$ will be energized under control of the 8 value key and that the head $32^7$ will be energized under control of the 2 value key during recording in sectors I and II respectively, of track *b*. Apart from this selection of the recording heads, the operation is similar to that already described in detail for the addition of two values, so that it will be appreciated that the signals recorded in track *b* will represent the sum of the value in track *a* and the complement of the value set up on the keyboard, that is, it will be equal to the difference between these two values.

With this arrangement each digit of the value set up on the keyboard is entered as a complement to 9, so that if the value in track *a* is larger than that set up on the keyboard, a 1 carry is necessary, that is, a carry from the highest denomination to the lowest. When the difference value is recorded in track *e*, if such a carry occurs it will be recorded in storage position $1^1$ of sector XII of track *e* by the normal operation of the arithmetic circuits. The presence of such a signal is utilized to fire the gas tube 147 to render the pentode 321 effective. Thus, when the signal recorded in sector I of track *e* is sensed by the head 58 the pentode 321 will be effective to amplify the signal and energize the head 60. Since the head 60 is displaced by one storage position from the head 59, the signal recorded in track *a* will be greater by 1 than that sensed in track *e*.

The signals in track *e* are sensed by a head 329 (FIGS. 4 and 8) which is spaced from the head 58 by a distance equal to two sectors less one storage position. Hence, the head 329 commences to sense sector XII of track *e* just before the head 58 starts to sense sector I of track *e*. The winding of the head 329 is connected to the control grid of a pentode amplifier 325. The primary of a transformer 326 is connected in the anode circuit of the pentode 325 and the secondary of this transformer is connected to the grid of the gas tube 147. The suppressor grid of the pentode 325 is connected through a resistor 327 to the negative supply line 305. This biases the suppressor grid sufficiently to prevent the flow of anode current in response to signals from the head 329. However, the suppressor grid is also connected to the brush $39^{13}$ (FIG. 5), via line 328. The brush $39^{13}$ will be connected through the segment 302 to the common brush 40 thus connecting the suppressor grid of the pentode 325 to the ground line 303 at the time that the sector XII of track *e* is sensed by the head 329. Thus the pentode 325 produces an output in the anode circuit only upon the occurrence of a signal in sector XII of track *e*, and such a signal produces an output in the secondary of the transformer 326 to ionize the gas tube 147.

The circuit comprising the pentodes 321, 322 and 325 and the gas tube 147 (FIG. 7) which effects the recording of signals in the track *a* with or without a carry thus operates in the same manner as the circuit comprising the pentodes 100, 101 and 113 and the gas tubes 52 (FIG. 6) which controls the recording of signals with or without a carry in the tracks *c* and *d*, except that in the case of the former circuit a carry can only be added during the recording of signals in sector I of track *a*.

The control grid of the pentode 320 (FIG. 7) may be connected to a magnetic head 332 (FIGS. 4, 7 and 8), which is associated with the track *f4*, by changing the position of a switch 331. Hence, sensing of signals in track *f4* will then control recording of signals in track *a*. The heads 59 and 332 lie on the same radial line, so that a value will be transferred unchanged from track *f4* to track *a*.

The anode of the pentode 322 may be connected to the winding of a head 333, which is associated with the track *f5*, by changing the position of a switch 330. Hence each time the pentode 322 is operated by the sensing of a signal in track *e*, or track *f4*, a signal will be recorded in track *f5*. Similar switched amplifiers (not shown) are provided for the tracks *f1*, *f2* etc., so that values may be transferred between the tracks as desired.

The disc 7 and the associated transducing heads provide a serial storage device in which successive denominational values may be read and recorded successively. Such a facility may be provided equally well by a drum having circumferential magnetic tracks. A magnetic drum store is disclosed in my copending patent application Ser. No. 498,047 filed May 25, 1954, now abandoned.

Multiplication of entered numbers is provided by the arrangement shown in FIG. 9. As already explained, the keyboard 1 (FIG. 1) may be used to enter ten digit numbers for addition and subtraction, and the disc 7 has a sufficient number of sectors to allow recording of the sum of two such numbers. However, the product of two ten digit numbers has twenty digits. Accordingly, the arrangement of FIG. 9 requires the use of a storage disc 557 which is similar to the storage disc 7 except that it through the windings of the heads $34^1$ and $34^2$ produces a substantially flux across the gaps of said heads.

In the example considered above of the addition of 28 and 28 a signal was recorded in the storage position $16^1$ of sector I of sub-track $b_8$. As the disc continues to rotate in a counterclockwise direction after this signal has been recorded, the signal will pass beneath and head $33^8$ and will induce a signal in the head winding. This signal is amplified by the pentode 98 and applied to the two pentodes 100 and 101. As explained this will energize the heads $34^1$ and $34^2$. The heads $34^1$ and $34^2$ lie on the same radial line as the heads $33^0$ to $33^9$ (FIG. 8), so that at the time they are energized the storage positions $16^1$ of sector I of the tracks *c* and *d* respectively will be beneath the two heads. That part of the track *c* which corresponds to the storage positions $10^1$ and $19^1$ in each of the sectors I to XII cannot be magnetized since there is no magnetic layer in these areas. Accordingly, although both the heads $34^1$ and $34^2$ are energized simultaneously, a signal will be recorded only in the storage position $16^1$ of sector I of track *d*. Since the storage positions $0^1$ to $9^1$ in the sectors I to XII of track *d* have no magnetizable layer it will be apparent that if the signal sensed by the heads $33^0$ to $33^9$ is in one of the storage positions $0^1$ to $9^1$ then a signal will be recorded in the corresponding storage position in the track *c*, and that if the sensed signal is in one of the storage positions $10^1$ to $19^1$ then a signal will be recorded in the corresponding storage position in track *d*. In other words, a signal is recorded in track *c* if the value in track *b* is less than ten, and a signal is recorded in track *d* if the value in track *b* is greater than ten.

The heads $35^1$ and $35^2$ are spaced from the heads $34^1$ $34^2$ by a distance equal to one storage position. Consequently, if a pulse from the pentode 98 renders the pentode 101 conducting, instead of the pentode 100, the value which is recorded in the track *c* or *d*, as the case may be, is greater by one than the value in track *b* which produced the recording. Hence, the pentode 101 is made effective when a carry from a previous denomination has to be taken into account.

If the gas tube 52 is rendered conductive, a relatively large voltage drop is produced across the cathode load resistors 102 and 103 so that the screen voltage of the pentode 101 is raised sufficiently to allow it to pass a substantial anode current when a positive pulse is applied to the control grid by the pentode 98. At the same time, the increased voltage drop across the resistor 102 raises the cathode potential of the pentode 100 to such an extent that the pulse applied to the control grid produces no change in the anode current. The gas tube 52 may be ionized by a signal applied to the control grid from an amplifier 51.

The amplifier 51 comprises a pentode 113 which receives signals on its control grid from a magnetic head 37 (FIGS. 6 and 8). The primary winding of a transformer 99 and the winding of a head 38 are connected in series in the anode circuit of the pentode 113. One end of the secondary winding of the transformer 99 is connected to the control grid of the tube 52 and the other end of the winding is connected through a resistor 315 to the negative supply line 305. The bias supplied to the grid of the tube 52 from the line 305 is sufficient to hold it normally non-conducting, however, this bias may be overcome by a signal induced in the secondary of the transformer 99 due to the flow of anode current in the pentode 113. The head 37 is positioned in track *d* and is spaced by a distance equal to fifteen storage positions from the head $34^2$. Hence, as the disc 7 continues to rotate, the signal which was recorded in the storage position $16^1$ of sector I of track *d* by the head $34^2$ will be sensed by the head 37 which will apply a signal to the grid of the pentode 113. The resulting increase in anode current induces a voltage in the secondary of the transformer 99, which increase is applied to the grid of the tube 52 to ionize said tube. Thus the pentode 101 is made operative and will remain so until after the signal recorded in sector II of track *b* has been sensed by the heads $33^0$ to $33^9$. The tube 52 will be extinguished after this by the action of resistor 316 and capacitor 104, in a manner similar to the extinguishing of the tube 68 (FIG. 5).

The anode current of the pentode 113 also energizes the head 38 to record a signal in track *e*. The head 38 is spaced from the head 37 by a distance equal to ten storage positions (FIG. 8) so that the sensing of the signal in storage position $16^1$ of sector I of track *d* causes the head 38 to record a signal in storage position $6^1$ of sector I of track *e*. Thus the digit value 6 is finally recorded in sector I of track *e*.

The continued rotation of the disc 7 causes the signal recorded in the storage position $4^1$ of sector II of subtrack $b_4$ to be sensed by the head $33^4$. The tube 52 is still conductive at this time, so that the pulse produced by the pentode 98 in response to the sensing of this signal produces a pulse of anode current in the pentode 101, so energizing the heads $35^1$ and $35^2$. The storage positions $0^1$ to $9^1$ of the track *d* cannot be magnetized, so that only the head $35^1$ is effective to record a signal. Since the head $35^1$ is offset by one storage position (FIG. 8) from the head $34^1$ a signal will be recorded by the head $35^1$ in storage position $5^1$ of sector II of track *c*. Since, no signal is recorded in sector II of track *d* the head 37 will not be effective to cause energization of the head 38 in the manner described in relation to sector I. However, the signal in sector II of track *c* is sensed by a head 36 which lies on the same radial line as the head 38. The winding of the head 36 is connected to an amplifier 50 formed by a pentode 111, the anode of which is connected to the junction between the primary winding of the transformer 99 and the winding of the head 38. Consequently, the head 38 is energized in response to the sensing of a signal by the head 36, but no voltage is developed in the secondary winding of the transformer 99. Since the heads 36 and 38 lie on the same radial line the sensing of the signal in the storage position $5^1$ of sector II of track *c* will cause the head 38 to record a signal in storage position $5^1$ of sector II of track *e*. It will be apparent from the foregoing detailed description of the recording of the sum digits in sectors I and II of track *e* that the zeros recorded in sectors III to XII of track *b* will cause recording of zeros in the corresponding sectors of track *e*. Thus the signals in the track *e* represent the sum of the number set upon the keyboard 1 and the number recorded in the track *a*.

It will be appreciated that signal recordings are transferred from track *b* to track *e* in the manner described above, whether the recording in track *b* is controlled jointly by the keyboard and track *a* or by the keyboard and track *n*.

The track *b* has been described as divided into ten subtracks. This is principally convenient since it allows a relatively large area for the mounting of the staggered heads 32. However, the operation of the device requires only that the heads 32 be spaced apart by one storage position in the circumferential direction. Hence the heads 32 may lie on the same circumferential line provided that the heads are of such physical size that the required spacing of the gaps may be maintained.

An erasing head (FIGS. 4, 6 and 8) is associated with each of the sub-tracks $b_0$ to $b_9$. The erasing heads are positioned a distance equal to one sector away from the heads $33^0$ to $33^9$. Similar erasing heads 63 and 64 are associated with the tracks *c* and *d* respectively, and lie on the same radial line as the heads 62. The heads 62, 63 and 64 are connected in series with each other and with a resistor 317 between the supply line 306 and the ground line 303. Consequently, a continuous current passes through these heads and they produce a magnetic field, in the opposite sense to that produced by the recording heads 32, 34 and 35, which is sufficiently intense to erase any signals recorded by the heads 32, 34 and 35.

is divided into twenty-two denominational sectors. It will be appreciated that the disc 7 may be used for multiplication provided that the number of digits in the two factors are such that the product does not exceed eleven digits.

A separate ten key kyboard 154 (FIG' 10) is used for entering the multiplier and multiplicand digits. A matrix of magnetic core elements is used for calculating the partial product digits, and the same matrix is also used to control recording of the multiplier and multiplicand digits as they are entered by the keyboard 154.

When a key of the keyboard 154 is depressed, it closes the corresponding one of contacts **154*a*. Each of these contacts is connected through individual wires of cable 550*k* to the ignition electrode of a corresponding one of gas discharge tubes $95^{0-9}$ (FIG. 9). Each of these ignition electrodes is connected to a negative bias supply through a grid resistor in the normal manner. The value of this resistor is relatively low, so that the current which flows through the grid resistor, the particular closed contact 154*a* and winding 417 of an electromagnet to ground is sufficient to energize the electromagnet. The voltage drop across the winding 417** is relatively small, so that the ignition electrode of the gas tube is brought sufficiently close to ground potential to ignite the gas tube.

The anode of each of the gas tubes $95^{0-9}$ is connected to one of a group of windings 260 to 269. Each winding 260 to 269 is common to a row of magnetic core elements. The rows of elements associated with the windings 265 and 266 are shown in more detail in FIG. 11. There are ten magnetic core elements 551 coupled to the winding 265 and a similar group of core elements 552 coupled to the winding 266. Each of the core elements is similar to the core element **23*c* of FIG. 2 and they cooperate with a rotor which is generally similar to the rotor 24 of FIG. 2. The elements 551 and 552** are shown arranged in rows and columns in FIG. 11, since the windings thereon are connected in a matrix arrangement of rows and columns, but it will be appreciated that each group of core elements is physically arranged in a circle about a rotor in the manner shown in FIG. 12.

Each row of cores has a bias winding 253 which is connected between a negative supply line and ground. Each column of cores has a common winding connected in the anode circuit of one of a group of gas discharge tubes $244^{0-9}$. For example, the left hand column of cores has a common winding 270, which is connected to the anode of the tube $244^{0}$ and the right hand column of cores has a winding 279 connected to the tube $244^{9}$.

Finally, each column of cores has a winding of the group 280 to 289 (FIG. 9). Each of these windings, except the winding 280 is split into two parts, e.g., the windings **284*a* and 284*b***. It will be apparent that the column windings are shown as narrow rectangles in FIG. 9.

The windings 281 to 289 which are suffixed *a* are connected in common to the ignition electrode of a tube 234, whereas those windings suffixed *b* are connected in common to the ignition electrode of a tube 235. These tubes are connected in a self-extinguishing circuit similar to that of the tube 68 of FIG. 5. In the cathode circuits of the tubes 234 and 235 are transformer windings 254 and 255.

The anode of the tube 234 may be capacitatively connected through switch 245 to the recording head 179, the group of recording heads $412^{1-10}$, or the group of heads $413^{1-10}$. The anode of the tube 235 is capacitatively connected to recording head 181.

Each rotor associated with a column of magnetic core elements is provided with a plurality of teeth 126. These teeth are staggered with respect to the core elements and also are staggered as between different rotors. They are so arranged that the magnetic circuits of all core elements representing the same units digit are completed at the same instant.

When the multiplier is to be entered, the switch 245 is set to the right hand position and switch 554 (FIG. 11) is closed. Pulses occur on line 555 at the beginning of the passage of each sector past the heads. These pulses are generated by a head corresponding to the head 300 (FIG. 4). Thus the gas tube $244^{0}$ is ignited at the beginning of each sector.

If the key for the digit value five is depressed, then the gas tube $95^{5}$ will be ignited and the winding 265 is energized. The winding 270 is also energized since the tube $244^{0}$ is ignited. Thus the magnetic core element which is coupled to both the energized windings is magnetized in the opposite direction to the magnetization normally provided by the bias windings 253. For those cores which are coupled to one energized winding only, the magnetization is substantially zero, the effect of the energized winding and the bias winding cancelling each other. The relative phasing of the windings is such that a positive pulse is produced in the secondary, or output, winding of a core which has the magnetic circuit completed by a tooth 126, only when that core has the direction of magnetization produced by two energized windings, that is, when the direction of magnetization is the opposite of that produced by the bias winding.

The teeth 126 are so positioned relative to the core elements and to the rotational position of the disc 557 that the magnetic circuit of a particular core element is completed by a tooth at a time which represents the decimal digit value associated with that core. Thus, the core which has now been doubly energized, that is, the core at the left hand end of the top row of FIG. 11, represents the digit value five, since it was energized by the entry of five and zero. The magnetic circuit of this core will therefore be completed at a time when the fifth storage position of a sector is beneath a recording head controlled by signals from the core matrix. The signal generated by this core will fire the gas tube 234. With the switch 245 set as described above, the firing of the gas tube will apply a pulse to the recording heads $413^{1-10}$. However, only the head $413^{10}$ is connected in circuit through the contact of the switch 420.

The heads 413 are positioned over track $f2^{1}$ (FIG. 9) of disc 557, that is, the track which corresponds to track *f*2 of the disc 7. The individual heads are spaced apart by a distance equal to one sector.

The firing of the tube 234 produces a pulse which is fed through the switch 245 in the right hand position, the recording head $413^{10}$, the contact arm of the switch 420 and the switch 419 in the position shown, so that the digit value five is recorded in the first sector of track $f2^{1}$. Each time a key of the keyboard 154 is operated the relay 417 of FIG. 10 is energized, and this operates the stepping switch 420 after the recording of a digit has been completed. The stepping switch is of the type commonly known as a uniselector.

Consequently, when the next digit which may be nine, for example, is entered on the keyboard 154, the same addition process in the core matrix takes place, but the pulse due to the firing of the tube 234 is now applied to the head $413^{9}$ and so on for subsequent digits so that the multiplier digits are recorded in successive sectors in the track $f2^{1}$.

The multiplicand is recorded in the track $f1^{1}$ in exactly the same way except that the switch 245 is set to the central position so that the pulses from the tube 234 are fed to the heads $412^{1-10}$, which are again selected in turn by the stepping switch 420.

During multiplication the track $a^{1}$ is used for accumulating the partial products and the track $b^{1}$ is used as an auxiliary track for dealing with the rearrangement of the digits in accordance with whether or not there is a carry in much the same way as is described above in connection with addition process on the disc 7.

At the start of multiplication tracks $a^{1}$ and $b^{1}$ both contain zero. As a first step, the first multiplier digit is sensed from track $f2^{1}$ to control the ignition of the corresponding one of the tubes $401^{0-9}$. The stepping switch 420 is in the position shown in FIG. 9 so that the head $414^{10}$ is effective to sense track $f2^1$ and the signals from this head are fed to the primary winding of the transformer 415. The signals from the secondary of this transformer are amplified by the pentode 290 (FIG. 10) and produce a corresponding pulse in the secondary of the transformer 416 to fire the gas tube 296. The firing of this tube produces a current in the primary coil 406 (FIG. 9) of a distributor via the line 550*e*, and the associated teeth $126^{10/0}$ to $126^{19/9}$ will complete the magnetic circuit to one of the secondary coils 407 which corresponds to the particular digit value which was sensed by the head 414 and will fire the corresponding one of the gas tubes $401^{0-9}$ to register the first multiplier digit.

At the start of each multiplying cycle, the gas tube 294 of FIG. 10 is fired by a pulse applied to the transformer 294*a* connected to the ignition electrode. When the tube 294 is fired, screen voltage is applied to the pentode 295 to allow it to respond to signals from the transformer 417. Since the stepping switch 420 is in the first position (as shown in FIG. 9), this transformer will receive signals from the head $411^{10}$ and the line 550*m*, so that signals will be induced in the transformer 246 corresponding to the multiplicand digits recorded in the track $f1^1$. These signals control firing of the gas tube 300 which is connected through the line 550*i* to the primary coil 404 of another distributor (FIG. 9). The teeth 423 of this distributor couple the primary coil 404 to the individual secondary coils 405 which, with the switch 155 in the position 156, are connected to the ignition electrodes of the gas tubes $95^{0-9}$.

Consequently, when the first multiplicand digit is sensed by the head $411^{10}$ the corresponding gas tube 95 will be fired. At the same time, the track $a^1$ is being sensed by the head $610^{20}$ which is connected for operation by the stepping switch 422. The signals sensed from the track $a^1$ are fed via switch 247 (shifted) and the line 550*c* to the transformer 296 (FIG. 10), the secondary of which is connected to the control grids of two pentodes 291 and 293. One or the other of these pentodes is selected for operation dependent on whether the gas tube 292 is fired or not. The tube 292 operates in a manner similar to that already described in connection with addition to determine whether or not the sensed value is increased by one.

Depending on whether the pentode 291 or 293 is effective, the gas tube 297 or 298 is fired. These two tubes are connected through lines 550*f* and 550*g* to primary coils $402^0$ and $402^1$ (FIG. 9). These two primary coils may be coupled magnetically to the secondary coils $402^0$ to $430^9$ by the teeth $126^1$. The position of the teeth is such that if the coil $402^0$ is energized then the secondary coil 403 which is energized corresponds to the digit value sensed from the track $a^1$, but if the coil $402^1$ is energized, then the secondary coil 403 which is energized will have a digit value greater by one than the digit value sensed in track $a^1$.

The secondary coils 403 are connected to the ignition electrodes of the tubes $244^0$ to $244^9$ so that one of these tubes is fired in accordance with the digit value sensed from the track $a^1$. Hence, at the end of the first step the first multiplier digit is set up on the tubes 401, the first multiplicand digit is set up on tubes 95 and the first digit from the track $a^1$ is set up on the tubes 244. Since this is the first cycle, the value from the track $a^1$ will in fact be 0.

The switch 245 is set to the left hand position, so that the sum value from the core matrix is recorded in track $b^1$ by one or other of the heads 179 or 181 depending on whether there is a carry or not. The heads 179 and 181 are spaced apart by a distance equal to ten storage locations. Hence, a signal from the core matrix will produce a recording in one of the nineteen storage locations, depending on the particular digit value represented by the signal and whether the signal operates the tubes 254 or the tube 253. Hence a record is produced in track $b^1$ of the same form as that produced in track $b$ of the disc 7. It is not necessary to use a group of heads corresponding to the heads 32 (FIG. 4), because the timing of the signal from the core matrix is representative of the digit value, as already explained.

The transfer of the recorded value from the track $b^1$ to the track $a^1$ is effected in the same way as the transfer from track $b$ to track $a$ of the disc 7 was effected. The sensing head on track $b^1$ and the recording head on track $a^1$ used for effecting this transfer are not shown in FIG. 9.

In sebsequent stages, the successive digits of the multiplicand will be set up on the tubes 95 and the corresponding successive digits from the track $a^1$ will be set up on the tubes 244. Thus, at the end of one revolution the multiplicand will have been added to the value recorded on track $a^1$ which is in fact 0 at this step and the sum will have been recorded back on track $a^1$.

The tooth $423^1$ moves at $1/10$ of the speed of the other sets of distributor teeth so that, at the end of the first revolution, it will have moved from the 0 position to the 1 position. On the second revolution, the multiplicand digits will again be set up successively on the tubes 95 and the digits from track $a^1$, which are now in fact the same as the multiplicand set up on the tubes 244. Consequently, at the end of the second revolution the track $a^1$ will now contain twice the multiplicand value. The tube 294 of FIG. 10 energizes an erasing head 231 which operates on the track $a^1$ to erase each digit recording after it has been sensed, to allow a recording of the new sum value after transfer from the track $b$.

These cycles are repeated until the tooth $423^1$ comes opposite that one of the coils 408 which is connected to the tube 401 which is energized. When this occurs, a pulse will be induced in the coil 409 which, via line 550*l* and transformer 410, will be applied to the tube 294 to extinguish it. This cuts off the pentode 295 and so prevents the multiplicand value being read out to fire the tubes 95. The erasing head 231 is also deenergized so that the last value recorded on track $a^1$ remains there. This value is equal to the multiplicand multiplied by the first multiplier digit.

There are now a number of idle cycles in which no addition takes place until a total of 10 cycles have been performed. The stepping switches 420 and 422 are then moved on one position, and the set of 10 cycles is repeated. Because the stepping switches have been shifted, the necessary column shifts will be obtained, to take account of the fact that the second multiplier digit has now been set up on the tubes 401. The operating magnets for the switches 420 and 422 are energized by cam contacts (not shown) which are controlled by the shaft carrying the tooth $423^1$.

These groups of 10 cycles occur in succession so that eventually the track $a^1$ contains the final product.

In order to round off a value the relay 424 (FIG. 9) is energized at the required denominational position under the control of the stepping switch 421 which is synchronized with the switch 422. The relay 424 operates the switch 418 in FIG. 10 to energize the gas tube 299. This, through wire 550*h* energizes the primary coil $402^5$ which has the effect of adding 5 to the digit value sensed from the track $a^1$ in a similar manner to the effect of the primay coil $402^1$.

The division process is generally similar to that for multiplication. The dividend is recorded initially in track $a^1$ and the divisor in track $f1^1$. The track $b^1$ is again used as an intermediate calculation track and track $f2^1$ is used for recording the quotient. The switch 155 is set to the position 157 so that the divisor value is subtracted from the dividend value in track $a^1$. The divisor and dividend are initially recorded in the tracks $a^1$ and $f1^1$ in such positions that the remainder value will go negative within 9 cycles of subtraction.

The occurrence of a negative remainder is determined by whether or not there is a negative carry in the last denomination position in track $a^1$. The occurrence of a negtaive remainder is used to generate a signal to extinguish the tube 294 to prevent further subtraction taking place.

Each group of 9 cycles is followed by a 10th in which the switch 155 is set to the position 156 so that the divisor is now added once to the value registered in track $a^1$ so returning to a positive remainder. The necessary column shifting is again effected by the stepping switches 420 and 422 as in the case of multiplication.

The physical arrangement of part of the core matrix device is illustrated in more detail with reference to FIGS. 11 to 14. The shaft 18 carries the rotor with teeth 126. The core elements 551 are mounted in a circle about the rotor. The rotor has nine teeth 126 evenly spaced, whereas there are ten elements 551, also evenly spaced. Thus for each rotation of the shaft 18 the magnetic circuit of each core element is repeatedly completed. A former 601 on each core element carries the windings 253, 265 etc. pertaining to that core.

What I claim is:

1. An arrangement for arithmetically combining a first and a second number, each of said numbers comprising digits, each of said digits corresponding to a determined denomination, said denominations being arranged in a predetermined order, comprising in combination, dynamic storage means having a plurality of groups of storage positions, each group assigned to a corresponding denomination, storage positions within a group being arranged in a predetermined order, groups of storage positions being arranged in a predetermined order corresponding to the order of said denominations in said numbers, numbers being stored in said dynamic storage means in such a manner that each digit of a number is represented by at least one data bit within a group of storage positions assigned to the corresponding denomination, said dynamic storage means having an input section with first input section storage positions storing said first number, an intermediate section with intermediate section storage positions, the number of said intermediate section storage positions per denomination exceeding the number of permissible digit values in a denomination, and an output section with output section storage positions, said input section, intermediate section and output section being operated in synchronism; first transfer means for transferring the data bits of said first number from said first input section storage positions to intermediate section storage positions whose positions relative to said first input section storage positions is a function of said second number and an intended arithmetic operation, whereby said intermediate section storage position may correspond to a digit value exceeding the maximum digit value permissible in a denomination; and second transfer means for transferring data bits from said intermediate section storage positions to said output section in such a manner that, for a given bit, the output section storage position corresponds to the same digit value as the intermediate section storage position wherein said bit was stored, if the digit value does not exceed said maximum digit value, and at the output section storage position corresponds to a digit diminished by the value of one denomination, if said intermediate storage position corresponded to a value exceeding said maximum digit value.

2. An arrangement as set forth in claim 1 wherein said dynamic storage means comprises a cyclic storage means.

3. An arrangement as set forth in claim 2 wherein said cyclic storage means is a magnetic cyclic storage means.

4. An arrangement as set forth in claim 3 wherein said magnetic cyclic storage means comprises a magnetizable disc; and wherein said intermediate section and said output section each comprise at least one track on said disc.

5. An arrangement as set forth in claim 3 wherein the maximum permissible number of digit values per denomination is 10.

6. An arrangement as set forth in claim 3 further comprising selector means for selecting subtraction or addition operation.

7. An arrangement as set forth in claim 1, wherein said second transfer means comprise carry signal generating means adapted to generate a carry signal in response to data bits transferred to said output section from intermediate section storage positions corresponding to digit values exceeding the number of permissible digit values in a denomination.

8. An arrangement as set forth in claim 7 wherein said arithmetic operation is addition; wherein said second transfer means comprise means responsive to said carry signal for transferring the bit in the next higher denomination from the intermediate storage location associated therewith to the next higher intermediate storage location.

9. An arrangement as set forth in claim 1 wherein said arithmetic operation is subtraction; wherein there are $n$ permissible digit values per denomination; further comprising means for furnishing the $(n-1)$ complement of the digit values in said second number for controlling said first transfer means.

10. An arrangement as set forth in claim 9, wherein a carry signal is generated in the highest denomination; and wherein the digit value in the lowest denomination is increased by one in response to said carry signal generated in the highest denomination.

References Cited

UNITED STATES PATENTS

| | | | |
|---|---|---|---|
| 2,787,416 | 4/1957 | Hansen | 235—61 |
| 2,895,674 | 7/1959 | Burns et al. | 235—167 |
| 2,832,064 | 4/1958 | Lubkin | 340—174 |
| 3,028,583 | 4/1962 | Fernekees et al. | 340—172.5 |

OTHER REFERENCES

Elementary Magnetic Drum Calculator, Enclosure 4 to Final Report on Contract CST-10133; Feb. 15, 1949; Engineering Research Associates, Inc., pp. 1-6 and 1 figure.

EUGENE G. BOTZ, Primary Examiner

D. H. MALZAHR, Assistant Examiner